United States Patent
Eckleder et al.

(10) Patent No.: US 7,739,507 B2
(45) Date of Patent: Jun. 15, 2010

(54) HARDWARE MULTIMEDIA ENDPOINT AND PERSONAL COMPUTER

(75) Inventors: Andreas Eckleder, Malsch (DE); Richard Lesser, Karlsruhe (DE)

(73) Assignee: Nero AG, Karlsbad (DE)

( * ) Notice: Subject to any disclaimer, the term of this patent is extended or adjusted under 35 U.S.C. 154(b) by 1097 days.

(21) Appl. No.: 11/279,077

(22) Filed: Apr. 7, 2006

(65) Prior Publication Data

US 2007/0100771 A1    May 3, 2007

Related U.S. Application Data (60) Provisional application No. 60/732,064, filed on Oct. 31, 2005, provisional application No. 60/741,802, filed on Dec. 2, 2005.

(30) Foreign Application Priority Data

Mar. 2, 2006    (EP) ................ PCT/EP2006/001918

(51) Int. Cl.
*H04L 9/00* (2006.01)
*G06F 7/04* (2006.01)
*H04L 9/32* (2006.01)

(52) U.S. Cl. .................. 713/172; 713/168; 713/169; 713/170; 713/171; 726/3; 726/4; 726/5; 726/6; 726/7

(58) Field of Classification Search .................. 713/172
See application file for complete search history.

(56) References Cited

U.S. PATENT DOCUMENTS

| | | | |
|---|---|---|---|
| 6,005,940 A * | 12/1999 | Kulinets .................. 705/51 |
| 6,236,727 B1 * | 5/2001 | Ciacelli et al. .............. 380/212 |
| 6,728,379 B1 * | 4/2004 | Ishibashi et al. ............ 380/278 |
| 2004/0029562 A1 * | 2/2004 | Sharon et al. ................ 455/410 |

\* cited by examiner

*Primary Examiner*—Longbit Chai
(74) *Attorney, Agent, or Firm*—Michael A. Glenn; Glenn Patent Group (57) ABSTRACT

A hardware multimedia endpoint is located on an adapter card of a personal computer system and comprises an interface for interfacing to the computer system and a processor for receiving cryptographic information from the computer, for processing the cryptographic information and for outputting cryptographic information to the computer. This exchange of cryptographic information is performed such that an authentication procedure with a third party, which is different from the computer, is established for the purpose of decrypting encrypted media content.

9 Claims, 8 Drawing Sheets

— ENCRYPTED MEDIA IS NOT DECRYPTED IN MEDIA READER

— MEDIA READER FEEDS

— ENCRYPTED CONTENT

— KEY INFO TO COMPUTER

Figure 12A:
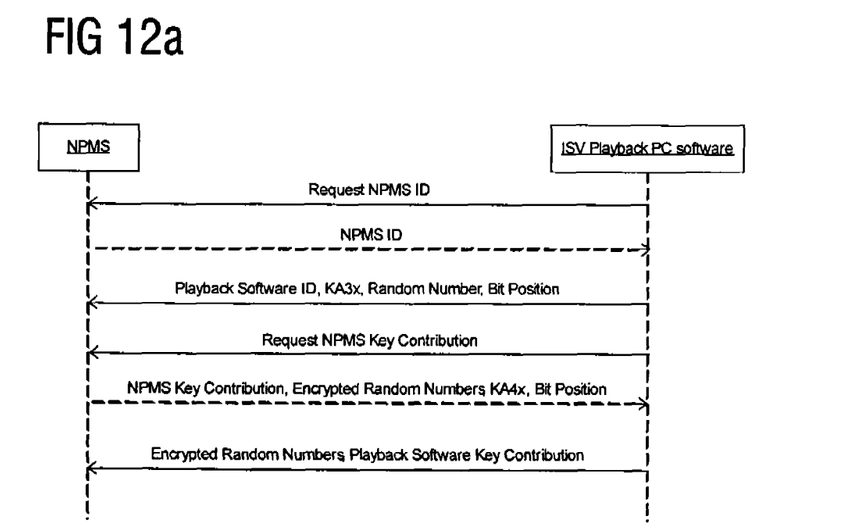
FIG. 12a illustrates the communication between the NPMS block and the PC playback software for the purpose of establishing a secure channel between both entities.
Figure 12B:
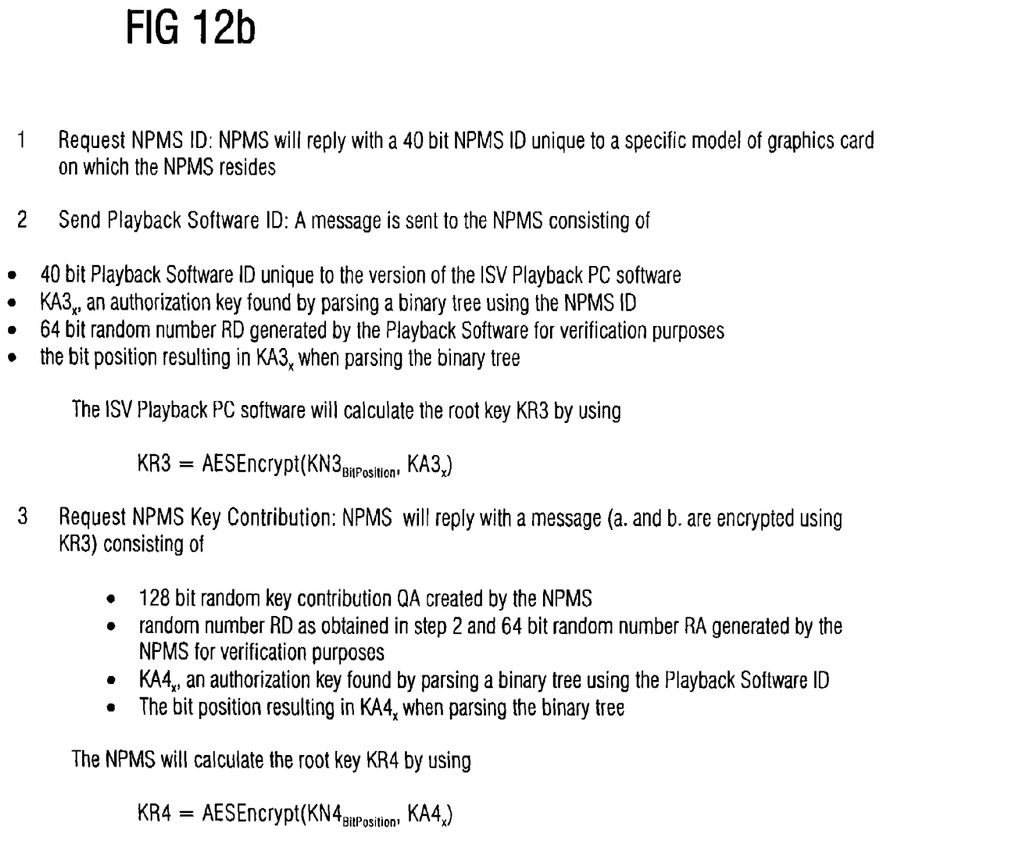

1. Request NPMS ID: NPMS will reply with a 40 bit NPMS ID unique to a specific model of graphics card on which the NPMS resides 2. Send Playback Software ID: A message is sent to the NPMS consisting of

- 40 bit Playback Software ID unique to the version of the ISV Playback PC software
- $KA3_x$, an authorization key found by parsing a binary tree using the NPMS ID
- 64 bit random number RD generated by the Playback Software for verification purposes
- the bit position resulting in $KA3_x$ when parsing the binary tree The ISV Playback PC software will calculate the root key KR3 by using $$KR3 = AESEncrypt(KN3_{BitPosition}, KA3_x)$$

3. Request NPMS Key Contribution: NPMS will reply with a message (a. and b. are encrypted using KR3) consisting of

- 128 bit random key contribution QA created by the NPMS
  - random number RD as obtained in step 2 and 64 bit random number RA generated by the NPMS for verification purposes
  - $KA4_x$, an authorization key found by parsing a binary tree using the Playback Software ID
  - The bit position resulting in $KA4_x$ when parsing the binary tree The NPMS will calculate the root key KR4 by using $$KR4 = AESEncrypt(KN4_{BitPosition}, KA4_x)$$

HARDWARE MULTIMEDIA ENDPOINT AND PERSONAL COMPUTER

CROSS-REFERENCE TO RELATED APPLICATION

This application is a continuation of copending International Application No. PCT/EP2006/001918, filed Mar. 2, 2006, which designated the United States and was not published in English, and is incorporated herein by reference in its entirety.

BACKGROUND OF THE INVENTION

1. Field of the Invention

The present invention is in the field of digital rights management and, particularly, relates to the protection of premium content such as blockbuster movies and other copyright protected content from being openly decoded on a computer such as a personal computer.

2. Description of Related Art

Personal computers are inherently insecure, because the software and hardware they are based on can be exchanged and extended freely, allowing a number of attack points to hackers and who else might want to get access to copy protected material.

On the other hand, this open architecture is exactly what has made the personal computer the success it has today.

Recently, efforts haven been made to thwart this open architecture in favor of a controlled environment in which copy protected material can be processed without exposing unencrypted data to the user. This requires considerable efforts that are both expensive and uncomfortable for the user experience.

Users will feel that they cannot decide freely what to do with their computers any more.

Nevertheless, the open nature of PC software still does not guarantee that by exploiting programming errors or utilizing holes in the security of the software that is used to create such a secure environment it is not possible to defeat the security built into such a controlled environment.

In the art, there exist a number of well-known content protection systems such as VCPS (VCPS=Video Content Protection System), CSS (CSS=Content Scramble System), or AACS (AACS=Advanced Access Content System).

Specifications for these systems are available in the internet. For example, the AACS system can be studied by referencing two "Advanced Access Content System (AACS), Introduction and Common Cryptographic Elements", Preliminary Draft, Revision 0.90, Apr. 14, 2005, available via "www.AACSLA.com/specifications". The same link provides access to two further AACS documents. These are "Advanced Access Content System (AACS), Recordable Video Book", Revision 0.90, Apr. 14, 2005, or "Advanced Access Content System (AACS), Pre-Recorded Video Book", Revision 0.90, Apr. 14, 2005.

AACS allows an encryption of all available content using an AES-128-bits-encryption algorithm. Furthermore, this system allows license key management, which means that even "protected" copies can be generated having a limited replay capability. Furthermore, license keys can be revoked, when it becomes known that certain players have been compromised in a non-legal way.

Thus, the advanced access content system specification defines an advanced and robust and renewable method for protecting audiovisual entertainment content, including high-definition content.

A problem of the application of all these well-known and cryptographically elaborate approaches is that, when those protocols are applied to personal computer systems, there exist several points of attack, which are not available when this scheme is applied within a player or even in a single chip. When, however, a computer system is considered, which includes an optical disk drive, a personal computer system having a main bus, to which the optical disk drive is connected, and having an output interface including a graphics adapter card and a connected display, the attacker has several possibilities to break the system.

Recently, the high definition multimedia interface (HDMI) has been developed, which provides a transmission of digital data from the graphics card to the display. However, in order to make sure that this digital data cannot simply be recorded, the digital data is encrypted before being output by the graphics card and is decrypted within the display device so that a hacker can only log encrypted data by observing the data connection between the graphics card and the display device.

On the other hand, there exist many well-known cryptographic protocols for establishing a secure connection between a first device and a second device such as the optical disk drive and the computer CPU. Such cryptographic protocols are illustrated in the "Handbook of Applied Cryptography", CRC Press, 1996. A well-known protocol is the Diffie-Hellman Exchange. Such protocols make sure that two parties can agree upon a communication key and can use this key for encrypting traffic between those parties without transmitting the key itself.

Therefore, also the traffic between the disk drive and the computer can be encrypted and, therefore, protected against un-authorized access.

However, an important point of attack remains, since the computer performs the cryptographic protocols in software on the general-purpose CPU. All actions performed by the CPU are, therefore, publicly available and are accessible so that all cryptographic protocols would not defeat attacks when they were implemented without a certain secure environment available on the personal computer itself. Such environments are known under the term "trusted platform module". Such a secure area on the computer would, however, contradict the open architecture philosophy for personal computers. Compromising this open architecture philosophy will result in a decreased flexibility of the whole system and, therefore, will end up in a decreased market acceptance of such a system. This is not acceptable for manufacturers due to the high-volume computer market.

SUMMARY OF THE INVENTION

It is the object of the present invention to provide an improved concept for protecting copyright protected content from being openly decoded without compromising the flexibility and market-acceptance of open computer architectures.

In accordance with a first aspect, the present invention provides a hardware multimedia endpoint having an interface for interfacing to a computer; and a processor for receiving cryptographic information from the computer, for processing the cryptographic information, and for outputting cryptographic information to the computer, wherein the processor is operative to process cryptographic information such that an authentication procedure with a third party, which is different from the computer is established.

In accordance with a second aspect, the present invention provides a personal computer system, having a personal computer bus having attached therewith a personal computer main processor; a data communication interface for establishing a communication to a key provider so that the key provider can communicate via the personal computer bus; and an internal interface attached to the personal computer bus, the internal interface being connected to a hardware multimedia endpoint as mentioned above, wherein the computer system is operative to receive and forward cryptographic information between the hardware multimedia endpoint and the key provider such that an authentication procedure between the key provider and the hardware multimedia endpoint, which are different from the personal computer main processor, is established.

In accordance with a third aspect, the present invention provides a method of operating a hardware multimedia endpoint with the steps of interfacing to a computer; receiving cryptographic information from the computer; processing the cryptographic information; outputting cryptographic information to the computer; and processing cryptographic information such that an authentication procedure with a third party, which is different from the computer is established.

In accordance with a fourth aspect, the present invention provides Method of operating a personal computer system comprising a personal computer bus having attached therewith a personal computer main processor and a data communication interface, with the steps of establishing a communication to a key provider so that the key provider can communicate via the personal computer bus; and establishing a communication to the hardware multimedia endpoint mentioned above so that the hardware multimedia endpoint can communicate via the personal computer bus; and receiving and forwarding cryptographic information between the hardware multimedia endpoint and the key provider such that an authentication procedure between the key provider, which is different from the personal computer main processor and the hardware multimedia endpoint is established.

In accordance with a fifth aspect, the present invention provides a computer program for performing, when running on a computer, one of the above mentioned methods.

The present invention is based on the finding that implementing cryptography in hardware makes it much harder for an attacker to find out secrets associated with it and/or to decrypt the protected content by using security holes or programming errors inherent in the implementation of cryptographic functions in a software on a general-purpose processor.

On the other hand, there is no easy way to reverse engineer chips, whereas any piece of software can be easily debugged using the appropriate tools as the PC architecture has been completely standardized and is well understood. Software can always be run in so-called emulation environments, where all instructions performed by a virtual CPU can be logged and interpreted.

Therefore, in accordance with the present invention, decryption of encrypted content is performed in a hardware multimedia endpoint, i.e., a device having an interface to a personal computer communication bus and having an output for multimedia data, which include audio data, video data, a combination of audio and video data, text data, meta data, executable programs, software libraries, etc.

Preferably, the hardware multimedia endpoint is a (graphics) adapter card, which is connected between a computer communication bus and a display device. Thus, it can be achieved that the cryptographic algorithms can be processed in hardware using a digital signal processor and an associated control, since this hardware device is located on a multimedia endpoint rather than any secured area in a non-open architecture. It is well known that any adapter cards such as audio adapters, video adapters, etc. have customer/device-specific functions. The same is true for audio output devices or video devices, which are, of course, application-specific devices, but which have standardized interfaces to personal computers, peripheral or non-peripheral components.

Thus, in accordance with the present invention, encrypted content is read-out from the data carrier and is forwarded via the personal computer communication resources to the multimedia endpoint such as a graphics adapter card and is, there, decrypted by a hardware decryption circuit. Naturally, this hardware decryption circuit could even be located within the computer monitor, i.e., within the display device itself. For the purpose of flexibility, however, it is preferred to locate the decrypter within a hardware multimedia adapter card and to, then, again encrypt the data using any general-purpose protocol such as the HDCP (HDCP High-Bandwidth Digital Content Protection) protocol, which is known in connection with the HDMT technology.

In preferred embodiments, the hardware multimedia endpoint is implemented as a single chip located on a graphics adapter. It is even more preferred to include hardware decryption capabilities and general-purpose encryption capabilities such as HDCP within a single chip so that the single chip performs a "transcoding" processing. In general, this chip receives video content encrypted using a first method and outputs an encrypted content encrypted using a second method, wherein, in general, only the transcoder requires encryption keys for both methods or at least a combination of both encryption keys.

BRIEF DESCRIPTION OF THE DRAWINGS

Subsequently, preferred embodiments of the present invention are discussed in detail with reference to the accompanying drawings, in which:

FIG. 12b illustrates an explanation of the data items shown in FIG. 12a.

DESCRIPTION OF THE PREFERRED EMBODIMENTS

The present invention defines a way of protecting premium content such as blockbuster movies and other copyright protected content from being openly decoded on a personal computer.

Premium content that is stored encrypted on a physical media or a server is typically protected using a separate key that can be obtained from a key server or a physical media through a reader for such media, using a cryptographically protected key exchange procedure.

The system of this invention does not decrypt content nor even retrieves the key necessary for decrypting the content on a PC but leaves this process to a chip located on a multimedia endpoint, being a device built in hardware that will deliver a signal (audio, video etc.) to the end user. Communication between this chip and the reader for physical media and/or the key server is done through a PC, but the PC merely forwards packets of encrypted data (key exchange information) whose secrets it does not understand. It can be said that the PC acts as a proxy between the multimedia end point and the provider of a cryptographic key.

The present invention therefore longs to completely cut the personal computer out of the loop of trusted entities participating in secure communication protected by cryptography. A PC merely serves as a proxy, sending packets back and forth between a multimedia end point and a key provider.

A key provider is an active entity able to communicate in packets of encrypted data understandable only to a communication partner sharing cryptographic secrets with the receiver. A key provider can be located nearby the playback device or remotely in the internet as long as it may exchange packets with the multimedia end point through a personal computer serving as a proxy.

A key provider may therefore be a physical media in conjunction with the hardware necessary to decode such media and communicate with the personal computer.

It may also be a key server located on the internet, providing playback keys for content previously downloaded or obtained by means of a physical media.

A multimedia end point is an active entity implemented in hardware, able to communicate in packets of encrypted data understandable only to a communication partner sharing cryptographic secrets with the originator. In addition to that it is a piece of hardware capable of rendering multimedia content it has received in encrypted form into a signal perceivable by the users, for example an audio or video signal.

The communication protocol used to exchange data between a key provider and a multimedia end point is dependent on the type of content to be reproduced. The protocol itself is therefore not a part of the invention but depends on the specific application of this technology.

An exchange of data is considered to be the alternating transmission of information between communication partners. This means that partner #1 sends a packet whereas partner #2 responds with a packet. It is part of the protocol definition to determine which communication partner is to begin with the transmission.

The PC serves as a proxy and must therefore process all incoming data packets from either side. It is also responsible for establishing the correct connections to the key provider, either by means of the internet protocol (the key provider is remotely located) or by means of a protocol used for communication with a physical media drive (the key provider is closely located). The type of action to be performed is always known to the PC initially as the user is interacting with the PC and not with the key provider and not with the multimedia end point. Hence, the PC needs to tell the multimedia endpoint, which type of key exchange procedure is to be performed. The multimedia end point will in consequence know whether it shall initially send or receive a data packet. The key provider typically only serves one type of cryptographic key. It therefore knows about the type of process it will be participating in and does not need to be configured this way.

The PC then begins by prompting the communication partner that is first in providing a data packet. Once that packet is received, it is sent to the other communication partner. Both communication partners are aware of whether they should send or receive a packet.

The PC then prompts the other communication partner for a reply packet, which it then sends to the first communication partner. This process repeats iteratively until bus key negotiation and exchange of cryptographic information is completed.

The PC may then start playback of protected content by sending the content itself in encrypted form to the multimedia end point. Protected content that is processed this way may originate from the same physical media as the (encrypted) key provided by the key provider but may also be located on a logically and/or physically distant location, as long as it is actually correlated to the cryptographic information that has been exchanged between the key provider and the multimedia end point. In other words, the protected content must have been encrypted with the cryptographic key provided by the key provider to the multimedia end point.

In a preferred embodiment, the system and method described in this invention will be applied to copy-protected information stored on optical media such as HD-DVD, Blue Ray, VCPS and CPRM media.

A PC graphics adapter carries a chip implementing the logical key exchange procedures necessary to communicate with optical disk drives for HD-DVD, Blue Ray, VCPS or CPRM media. The PC graphics adapter serves as a multimedia end point whereas the combination of HD-DVD, Blue Ray, VCPS or CPRM media and a corresponding optical disc drive capable of reading such media serves as a key provider.

A graphics adapter driver is used to communicate with the chip located on the graphics adapter. It allows setting the kind of key exchange procedure to be used, send data packets and prompt the graphics adapter for a reply packet.

A user mode application running on the PC organizes communication to the optical disc drive and to the graphics adapter driver. It also serves as an instance deriving from a user input the type of action to be performed and triggering the suitable key exchange procedure.

The present invention shows how premium content can be played securely by implementing the copy protection and decryption technology in hardware rather than software, with remarkable advantages: very high security, operating system independence as it runs on Vista, XP, 2000, Linux, Mac OS, etc and easy for any ISV to support on a PC. It also shows that all these advantages can be accomplished with a minimum of the effort otherwise required to create a secure environment in which software implemented cryptography can run safely on a Personal Computer.

Playing premium content on a consumer PC has been a significant threat to content security for some time now. If a content format governed by a particular cryptographic system gains enough market acceptance, some hackers will eventually succeed in circumventing that cryptographic system if it is implemented in software.

The reason for this is simple: Personal Computers are designed to have an open architecture. Modules of various vendors are combined to gain the flexibility and power of modern PCs. Due to this open architecture there is always a risk of somebody finding a way how to plug into a security component protecting the rights of content providers and disabling it.

The purpose of preferred embodiments of this invention is to describe a way how maximum security can be reached without taking away the power modern computers provide through their flexibility. The approach is different to ongoing efforts of various companies to make the PC platform more secure. However, security comes to the price of decreased flexibility. It is believed that the PC platform should remain the open platform it is today. This platform is, however, able to play premium content on all operating systems without putting it at risk of piracy.

The current approach has several advantages over platforms like Microsoft's PVP technology:

It supports today's home computing platforms like Microsoft Windows XP. It does not require new platforms that will possibly not reach that much of an audience at the very beginning.

This invention is open to platforms like Linux, Mac OS X, . . . because it does not rely on artificial security created by the operating system.

This invention does not require encryption/decryption of multimedia content to be performed in software, significantly decreasing the amount of CPU time required for content playback;

it is ready for HD content playback on almost all platforms that are on the market today; and no additional encryption is required as the encrypted signal is sent directly from its source to the graphics card without re-encryption.

This invention is a very safe technology because content cryptography is implemented in hardware.

Figure 1:
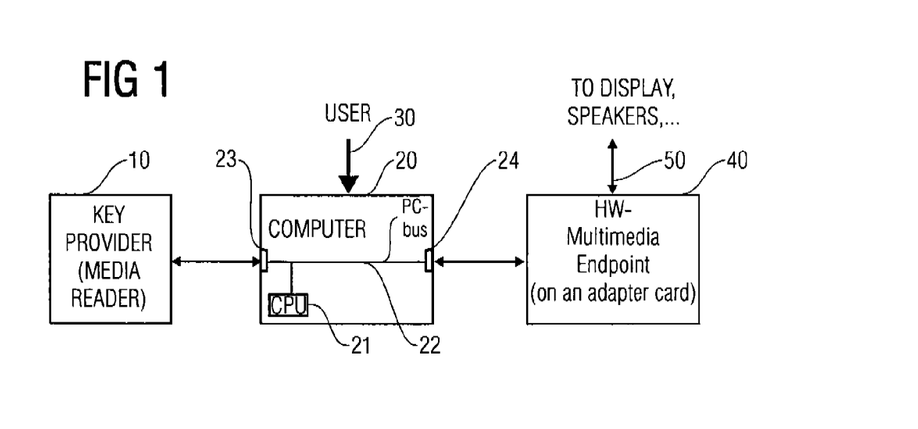
FIG. 1 illustrates a schematic overview over the whole system.

FIG. 1 illustrates the three main components, which are used when practicing preferred embodiments of the inventive concept.

There exists a key provider 10, which may be a media reader, when an encrypted decryption key is already stored on the media such as a DVD itself. Alternatively, however, the key provider could also be at any location on the internet, where a computer accesses the key provider to obtain media decryption information, when no such encrypted decryption key is located on the media itself. When the key provider 10 is located on the internet, the computer may already have the encrypted content, which is to be decrypted using the information provided by the key provider. When, however, the encrypted decryption key is located on the DVD itself, then the key provider is the optical disk drive, or stated in general, the media reader.

The media reader 10 interfaces with the computer 20, which is accessible by a user via a user interface 30. The computer 20 is also interfacing with the inventive hardware multimedia endpoint, which may be an adapter card or a chip on an adapter card, or a part of a chip of an adapter card. The adapter card, which is preferably a graphics or audio adapter card, is connectible to a display device or to a speaker device via a premium content output interface 50.

Thus, the personal computer system comprises a personal computer bus 22 having attached therewith a personal computer main processor 21, a data communication interface 23 for establishing a communication to a key provider 10 so that the key provider 10 can communicate via the personal computer bus (22); and an internal interface 24 attached to the personal computer bus 22, the internal interface being connected to the hardware multimedia endpoint The computer system is operative to receive and forward cryptographic information between the hardware multimedia endpoint and the key provider 10 such that the key exchange procedure with the key provider, which is different from the personal computer main processor 21 is established.

Figure 2:
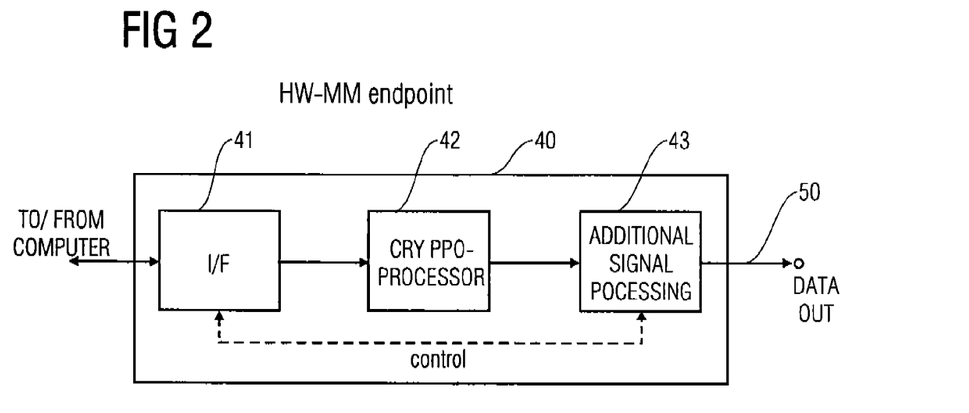
FIG. 2 illustrates a schematic implementation of a hardware multimedia endpoint.

FIG. 2 illustrates a preferred embodiment of the hardware multimedia endpoint 40 shown in FIG. 1. Preferably, the hardware multimedia endpoint is implemented as a processor and includes an interface 41 for interfacing the computer 20, a crypto-processor 42 for receiving cryptographic information from the computer via the interface, for processing the cryptographic information and for outputting cryptographic information to the computer, for example, within an authentication protocol.

The crypto-processor 42 is further operative to perform the decryption of the encrypted premium content, which is then output into an additional signal-processing block 43, which can implement any well-known graphics adapter data processing routines, and which can also implement an HDMI-conforming HDCP encryption. Finally, data processed by the additional signal processing is output at the data output 50 to a rendering device such as a display or a speaker device.

Figure 3:
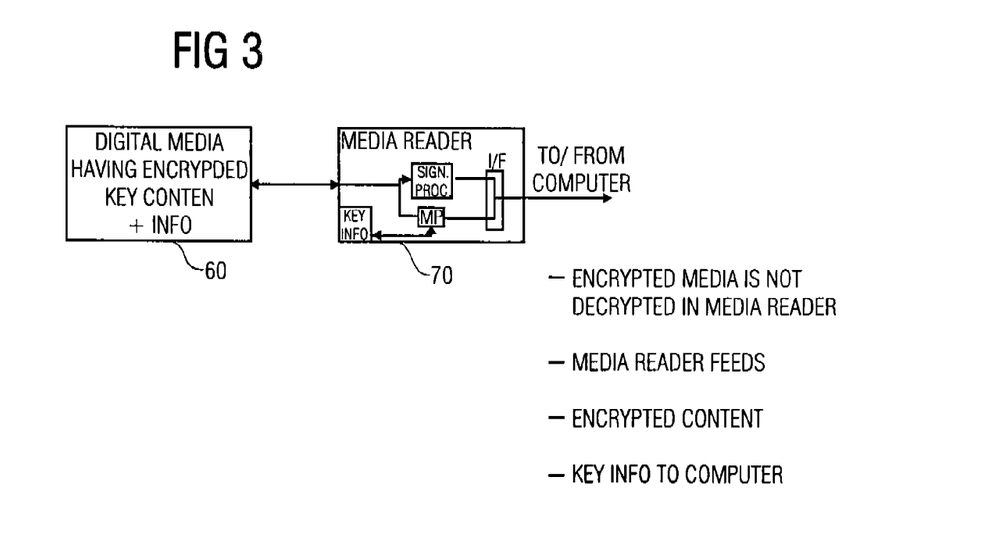
FIG. 3 illustrates the cooperation between a digital media and a media reader.

FIG. 3 illustrates a general cooperation of the digital media having encrypted content and key info 60 and a media reader 70. Typically, the digital media will be a DVD, which has, in addition to the encrypted content, also an encrypted version of the key used for decrypting the encrypted content. This key or at least a part of this key is stored on the media in a so-called media key block. The way for producing and for storing this media key block depends on the used content protection protocol such as CSS, VCPS, or AACS. In general, certain secret information is necessary in addition to the key information on the disk so that a media decryption key can be calculated.

In accordance with the present invention, the media reader may include a signal processor, a microprocessor, key information storage, and an output interface to or from the computer. However, the encrypted media is not decrypted in the media reader. Instead, the encrypted media data is read from the media and forwarded to the computer.

Furthermore, the media reader feeds key information to the computer, which will normally be the key information stored on the media, since this key information is already in encrypted form.

Alternatively, the media reader could negotiate a session key with the hardware multimedia endpoint so that the media reader could even retrieve the decrypted key information. In this case, the media reader could then encrypt this decrypted key using the session key negotiated with the multimedia endpoint so that, in any case, the personal computer player software is not able to retrieve a decrypted multimedia key from the traffic between the digital media reader and the hardware multimedia endpoint.

Figure 4:
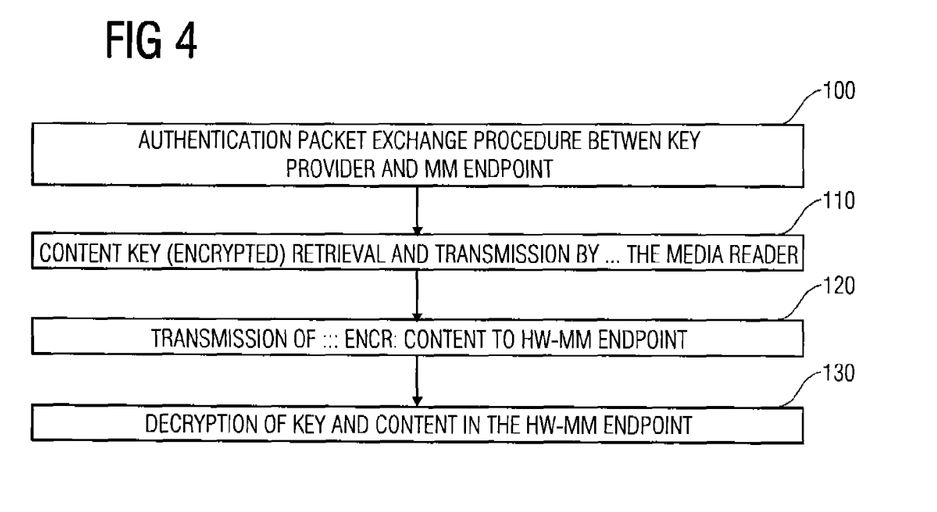
FIG. 4 illustrates a flow chart for illustrating the method of obtaining decrypted content.

In general, the method of outputting data from the hardware multimedia endpoint is shown in FIG. 4. In step 100, an authentication packet exchange procedure is performed between the key provider such as the optical disk drive and the hardware multimedia endpoint such as the graphics adapter. In this process, both entities communicate via authentication packets, which are designed such that they do not provide useful content for a third party. Furthermore, these authentication packets are transmitted via the third party, i.e., via the computer. In this context, the computer is used as a proxy server, i.e., the transmission facilities of the computer are used, but the computer is not able to understand the authentication packets. Particularly, the computer's facilities to prompt a device for replying with a packet, to receive a packet from a device and to send a packet to a device are used.

Furthermore, in step 110, the encrypted content key is retrieved from the media by the media reader and is transmitted to the multimedia endpoint. Then, in step 120, the encrypted content is transmitted from the media reader to the hardware multimedia endpoint. Finally, in step 130, the encrypted content key is decrypted or, generally, reconstructed using secret information only available to the hardware multimedia endpoint so that the encrypted content can be decrypted in the hardware multimedia endpoint and directly output or again encrypted via a further encryption method such as HDMI.

Figure 5:
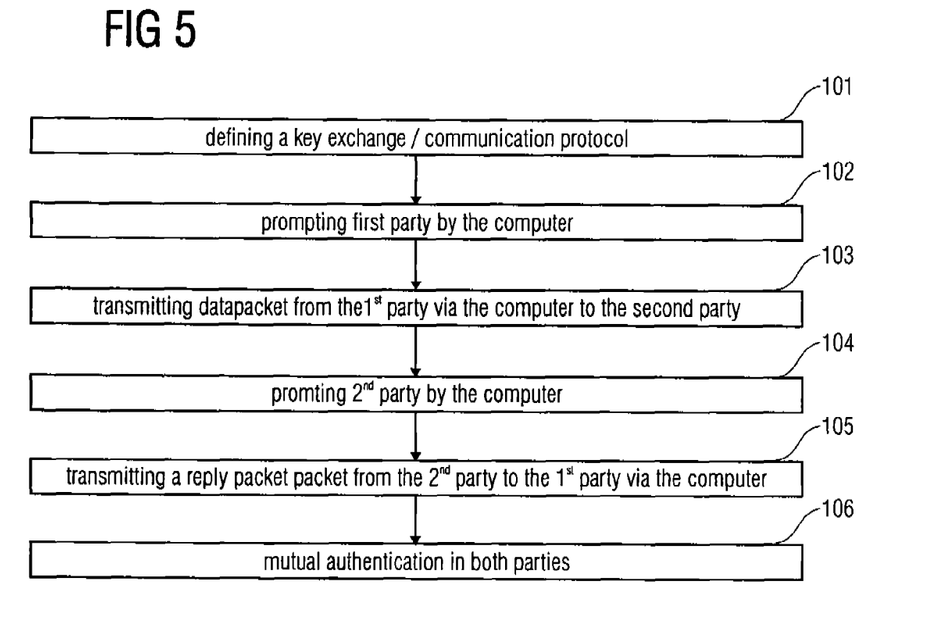
FIG. 5 illustrates a more detailed method of obtaining encrypted content having a back and forth transmission of authentication packets, which can not be read and understood by the personal computer software.

FIG. 5 illustrates a more detailed process particularly illustrating the authentication packet exchange procedure between the key provider and the multimedia endpoint illustrated in step 100 from FIG. 4.

First of all, there has to be a step of defining a key exchange/communication protocol 101, when there exists a plurality of such protocols. When there only exists a single protocol, then step 101 is not required, since, as soon as a media is entered into the optical disk drive, the PC software will start the single available communication protocol by prompting a first party in step 102 of FIG. 5. In response to this prompting step 102, the first party, which may be the disk drive, will reply by transmitting a data packet to the computer. Then, the computer will forward this received packet without being able to understand or derive information from this packet to the third party as shown in step 103. In response to sending the data packet received from the first party to the second party, the computer will automatically prompt the second party in step 104. In response to this prompting step 104, the second party will generate and transmit a reply packet to the computer, which will then forward this reply packet to the first party as shown in step 105 in FIG. 5. Again, the computer will not be in the position to decrypt the reply packet or to process the reply packet alone or together with the packet involved in step 103 to reconstruct any multimedia key, since the communication protocol between the first party and the second party is such that for retrieving any secret information, the public information from the first party or the public information from the second party will not be sufficient. Instead, additional (secret) information is necessary so that the first or the second party can retrieve the correct multimedia key for decrypting the encrypted multimedia content. Nevertheless, as shown in step 106, the mutual communication in steps 102 to 105 will be sufficient for allowing a mutual authentication between the key provider and the hardware multimedia endpoint so that the transmission of encrypted multimedia data from the media drive to the hardware multimedia endpoint can be started. When, however, the mutual authentication fails, the media reader will not output any encrypted data.

In the following, an even more detailed preferred embodiment of the present invention will be discussed in connection with FIGS. 6 to 12b. In this context, several acronyms will be used. These acronyms are explained below:

Direct Protected Media Path (DPMP). This is our internal name for the technology described in this document.

Nero Protection Management System (NPMS). The Nero Protection Management System is the central cryptographic component residing on the graphics board. This component performs authentication with the premium content source and decrypts the content once it has reached the secure environment of the graphics card.

Authentication. Authentication in the context of this document means the process of verifying that both source (the optical storage device) and destination (the NPMS residing on the graphics card) for premium content are authorized components.

Navigation Pack. Navigation pack means a pack of PES packets containing navigation information. Navigation packs are unencrypted and will be processed by the presentation module implemented in software. Navigation packs are also forwarded to the NPMS to derive copy control information.

Premium Content. Premium content means high-resolution digital content such as HD-DVD or Blu-Ray content. It is essential that premium content be protected against stealing by secure content protection technology as if it becomes available in unencrypted form it can be copied freely without any loss of quality.

Advanced Resource File (ARF). Advanced resource files contain elements such as images, animations, effects and fonts that are used for advanced content presentation on HD-DVD optical media.

Advanced Access Content System (AACS). AACS is the content protection technology used for the upcoming HD-DVD and Blu-Ray optical storage formats for premium content.

Content revocation list (CRL). A content revocation list is a cryptographically signed list of revoked content that may never be played by DPMP technology according to the AACS licensing conditions.

HDMI. HDMI is a digital interface and connector for transferring high definition high quality audio and video content. It will be used for sending premium quality content to HD enabled visualization and audio equipment after it has been processed using DPMP technology.

HDCP. HDCP is the content protection technology used for encrypting an HDMI signal so it can be used only for the purpose it is being provided for.

ISV. Independent Software Vendor

DSP. Digital Signal Processor

Figure 6:
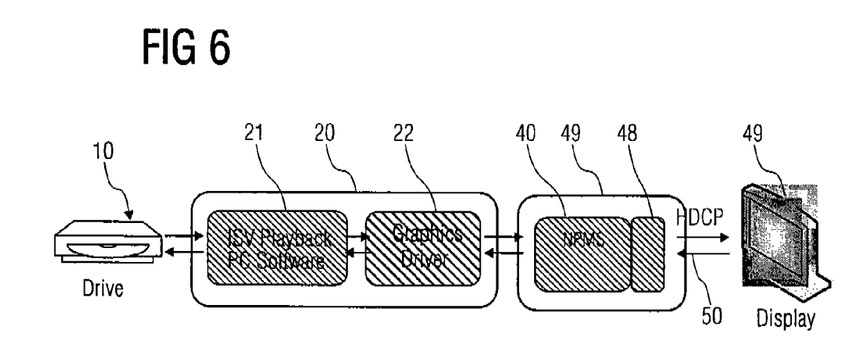
FIG. 6 illustrates a schematic overview of a preferred embodiment.

FIG. 6 illustrates the system overview similar to FIG. 1. The key provider 10 corresponds to the drive 10 in FIG. 6. The computer 20 of FIG. 1 corresponds to item 20 in FIG. 6. The hardware multimedia endpoint 40 in FIG. 1 corresponds to item 40 in FIG. 6. Furthermore, FIG. 6 illustrates a display 49 connected to the hardware multimedia endpoint 40 via the HDCP/HDMI channel 50.

Regularly, the computer 20 includes an ISV playback PC software entity 21 and a straightforward graphics driver 22, which connects the playback/PC software to the graphics card 40. Now, the graphics driver 22 is operative to perform a two-way communication with respect to the ISV playback/PC software on the one hand and the NPMS item on the other hand.

Figure 7:
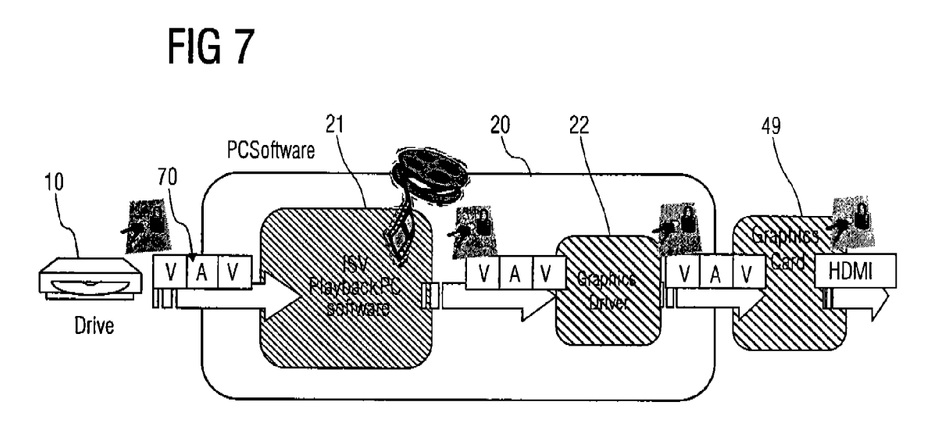
FIG. 7 illustrates a more detailed system overview of the preferred embodiment.

In the FIG. 7 embodiment, the hardware multimedia endpoint is provided on the graphics card 49, which is connected to the computer via an insertion slot. The hardware multimedia endpoint is in this embodiment an NPMS device, which is located near the HDCP encrypter 48. Although item 40 and item 48 are shown as separate elements, it is preferred to implement the functionalities of the NPMS device and the HDCP encrypter within a single chip. Naturally the graphics card 49 may include further circuitry for straightforward graphics card processing purposes such as digital signal processors and storage elements.

Thus, the present invention is operative to securely decrypt high definition content without exposing it to the threat of compromised software or hacker tools. Thus, decryption is performed in a multimedia endpoint rather than in the PC general purpose CPU (21 FIG. 1) and preferably, this decryption is performed only on the graphics card, where in the transfer from the graphics card to the display is furthermore protected.

The so-called DPMP or direct protected media path system consists of various components interacting with each other. The content protection is implemented in hardware on the graphics board. The circuitry responsible for handling content protection is the hardware multimedia endpoint 40 in FIG. 6. This device will talk to the optical storage device for performing cryptographic authentication. Thus, no title keys or similar sensitive material will be known to the ISV playback PC software at any point.

There are several key differences to traditional playback models on personal computers:
1. Authentication does not take place between Drive and ISV Playback PC software.
2. Authentication takes place directly between Drive and NPMS.
3. ISV Playback PC software and Graphics Driver are only transmitters of authentication packets, they do not process those packets in any way.
4. Security between Graphics Card and Monitor via HDCP.

Subsequently, FIG. 7 will be discussed for describing a (simplified) playback process for premium content. The drive outputs video and audio data illustrated at 70. this data is encrypted. The ISV playback PC software 21 forwards this encrypted data to the graphics driver, which again, forwards these data to the graphics card, where the AACS decryption is removed and the HDMI encryption is performed so that a complete encrypted direct media path from the drive to the display is assured.

As can be seen, the graphics card receives both audio and video signals. In fact, both will be processed by respective decoders after being decrypted by the graphics card's NPMS and converted into signals suitable for HDMI output. Those signals will then be multiplexed into an HDMT compliant audio/video stream and encoded using HDCP within the graphics card 49.

Figure 8:
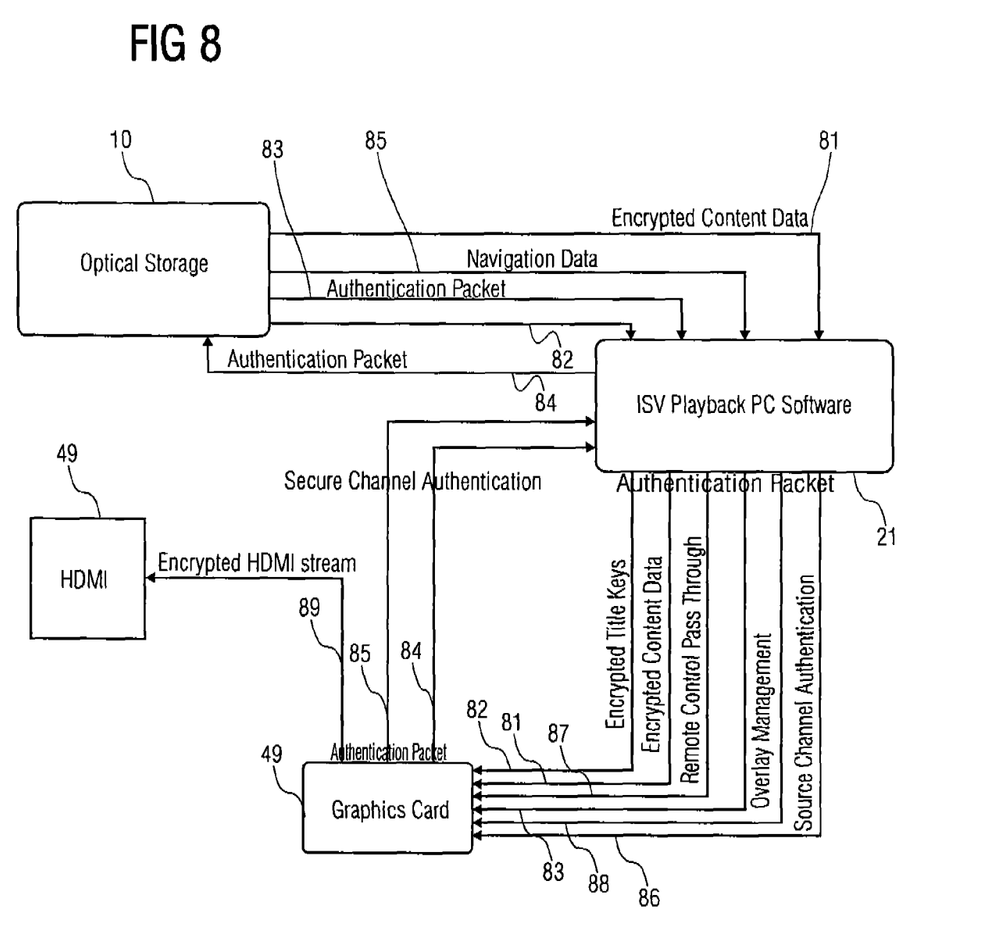
FIG. 8 illustrates the inventive system and the data flow of premium content and cryptographic secrets.

FIG. 8 illustrates the DPMP system with its components and the data flow of premium content and cryptographic secrets. The optical storage 10 outputs encrypted content data 81 and encrypted key information, which are called "encrypted title keys" in FIG. 8 at 82. Furthermore, the optical storage and the graphics card exchange authentication packets in both directions via the ISV playback PC software 21 as shown at 83 in the storage/graphics card direction and as shown at 84 in the graphics card/optical storage direction.

Furthermore, the optical storage provides navigation data 85 for performing menu operations of menus in the DVD or for even performing small programs such as JAVA patches or JAVA-scripts. This navigation data can include encrypted and non-encrypted content.

As enhanced navigation code may be encrypted and the original content key is unknown to the ISV Playback PC software, that code must be decrypted by the NPMS and propagated to the ISV Playback PC software. This must not happen in clear text. The title key used to encrypt the enhanced navigation code on the physical media must not be known to the ISV Playback PC software because it can be used to decrypt premium content as well. Therefore, the NPMS must decrypt the enhanced navigation code and re-encrypt it with a different key previously established with the ISV Playback PC software.

Therefore, there exists a secure channel authentication functionality between the graphics card and the ISV playback PC software illustrated by data paths 85 from the graphics card to the PC software and 86 from the PC software to the graphics card. For the purpose of secure channel authentication one may perform the same functionality as the authentication between the optical storage and the graphics card when the underlying cryptographic protocol is considered. This means that all available key exchange protocols can be used to make sure that the PC software 21 is an authentic entity so that the graphics card 49 can accept decrypted navigation data from software entity 21.

Furthermore, the data path scheme in FIG. 8 includes a remote control path through the channel 87 for forwarding remote control data from the PC software to the graphics card. Finally, the inventive system preferably supports overlay management features as illustrated by channel 88 so that two different digital contents can be played on a single display such as in a window mode.

The graphics card 49 outputs an encrypted HDMI stream 89, which is forwarded to the HDMI conforming display 49.

Figure 9:
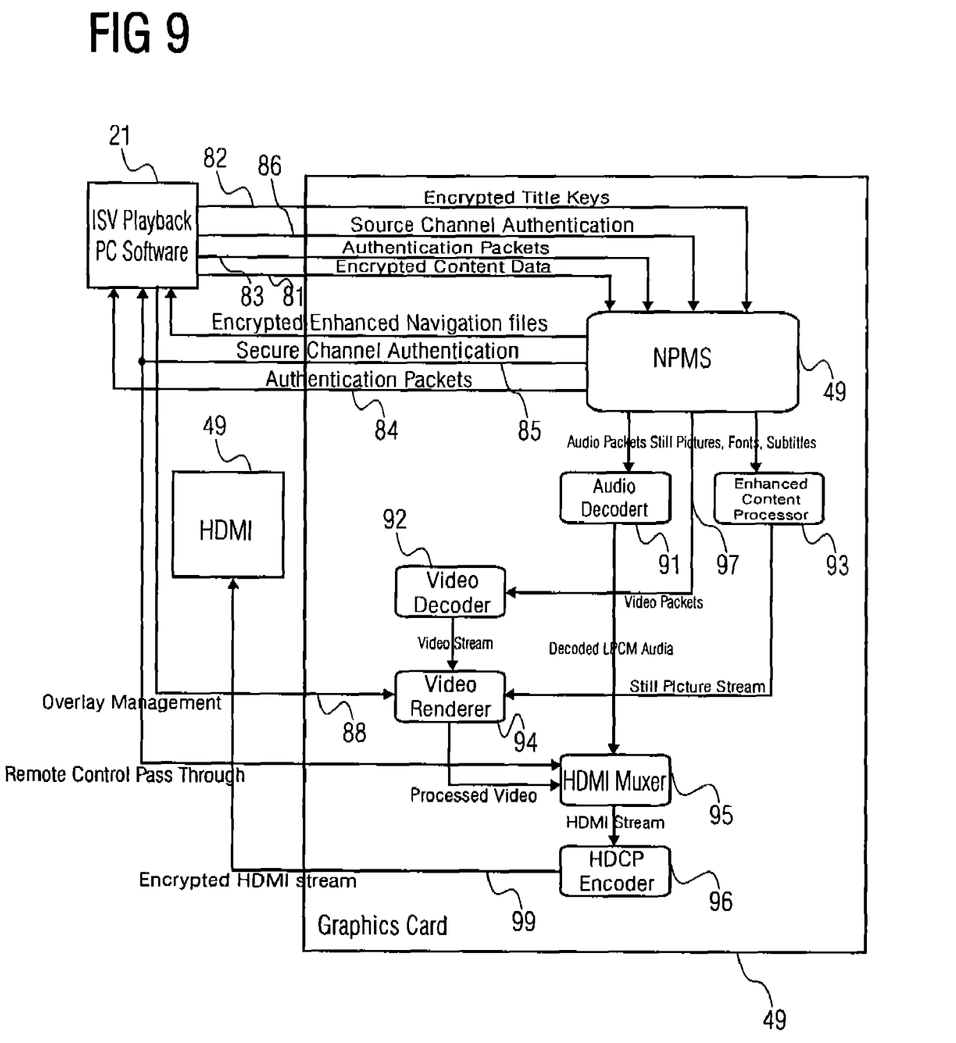
FIG. 9 illustrates a detailed view of the graphics card of FIG. 8.

Subsequently, the graphics card 49 of FIG. 8 will be discussed in detail in connection with FIG. 9. The hardware multimedia endpoint 40 corresponds to the NPMS block in FIG. 9. The graphics card furthermore includes a straightforward audio decoder 91, a video decoder 92, an enhanced content processor 93, a video renderer 94, an HDMI multiplexer 95, and an HDCP encoder/encrypter 96. The normal audio packets are decoded by the audio decoder 91 and fed to the HDMI multiplexer 95. The straightforward video packets on line 97 are input into the video decoder 92, which may be any one of the known MPEG video decoders or any other video decoders. Furthermore, the video content can include still pictures such as JPEG pictures, fonts or sub-titles, which are forwarded in the enhanced content processor 93 to generate still picture streams, which are, in addition with the output of the video decoder 92 input into the video renderer to finally render the video, which is to be displayed on the display device 49. To make sure that the overlay management works as desired, corresponding control commands are also input into the video renderer so that the matching video stream frames and still picture frames are combined by the video renderer.

Subsequently, the internal construction of the NPMS block 49 will be shown in connection with FIG. 10.

Figure 10:
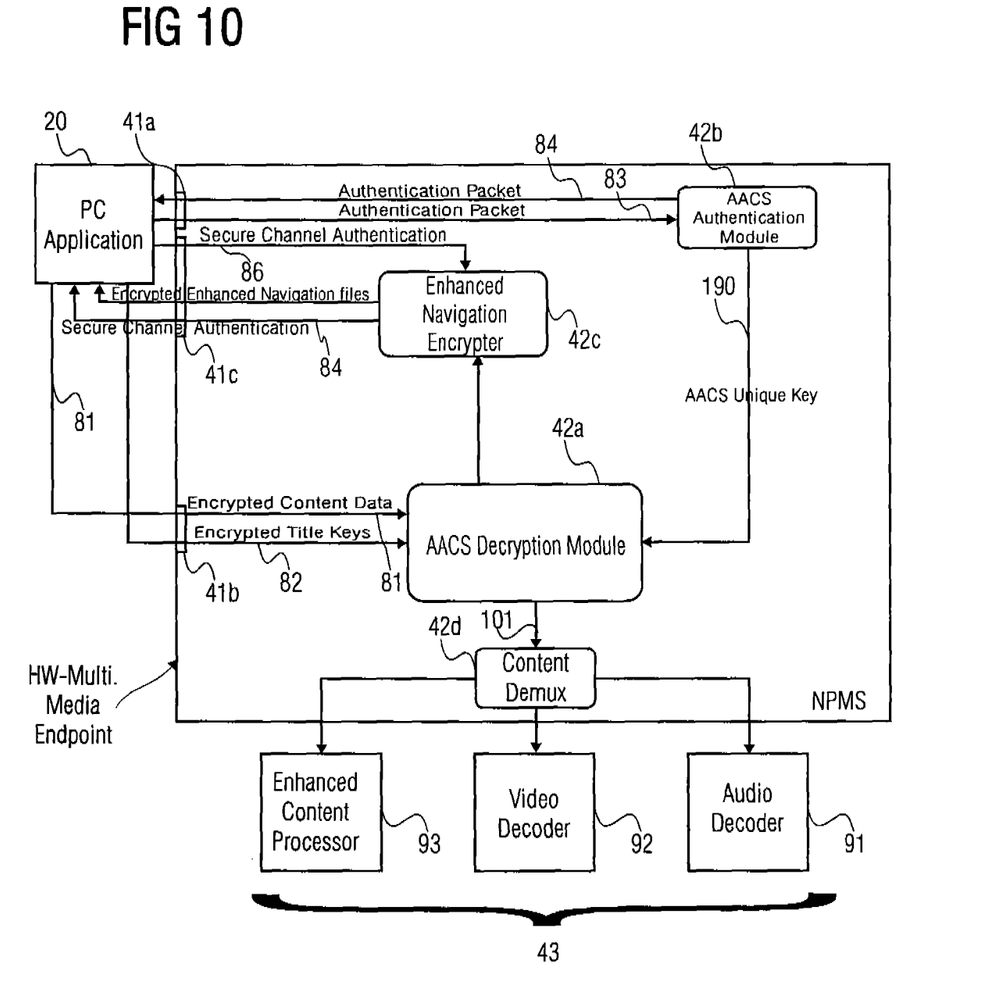
FIG. 10 illustrates a detailed description of the components and the data flows of the NPMS block of FIG. 9.

When FIG. 2 and FIG. 10 are compared, it becomes clear that the interface 41 generally illustrated in FIG. 2 corresponds to the items 41a, 41b and 41c in FIG. 10. Item 41a is the authentication interface, while item 41b is the key information and encrypted content data interface portion.

Furthermore, the crypto-processor 42 generally illustrated in FIG. 2 includes a decryption module 42a, which receives, as an input, a plain text decryption key 100, and which outputs a decrypted content at 101. Furthermore, the crypto-processor generally illustrated in FIG. 2 includes an authentication module 42b, which is operative to perform the authentication with the key provider via the PC application. Furthermore, it is preferred that the authentication module 42b not only performs authentication tasks, but also performs key retrieval tasks so that the unique key 100 is generated. This unique key 100 is then used for decrypting the encrypted title keys provided via line 82 to the decryption module 42a.

The crypto-processor 42 furthermore includes an enhanced navigation encrypter 42c, which can generate a secure channel authentication with the PC application via logical channels 84 and 86. However, for the purpose of content decryption, no authentication between the NPMS system and the PC application is required, since the PC application cannot use any content or key information. The PC application is only used as a sender/transmitter and protocol controller but cannot decrypt any content-related data.

The enhanced navigation encrypter is operative to receive decrypted enhanced navigation data from the decryption module 42a. As outlined above, this data may include straight-forward DVD navigation data or more enhanced program data in the form of executable programs/scripts.

FIG. 10 embodiment illustrates the invention in the context of the AACS protocol. However, the same construction can be used for other systems such as VCPS.

Subsequently, several functionalities will be discussed in detail.

The authentication will be performed directly between the NPMS and the optical storage device by exchanging data packets as outlined for example in the above-referenced AACS documents. The difference to this normal AACS system is that the TSV playback PC software serves as an intermediary, triggering packet sending back and forth of both devices. The intermediary never knows about the content of the packets, as it does not participate actively in the authentication progress.

The content navigation is the only major part of the premium content playback progress implemented in software. As presentation has become so much richer with the new generation of optical media and content delivery systems, the flexibility of a powerful software implementation is the only way to assure a stunning user experience by playing a title. By keeping all unencrypted content and cryptographic secrets away from the ISV playback. PC software, the inventive process nevertheless uses the power and flexibility of a software implementation for presenting premium quality content while at the same time guaranteeing absolute security to the content. The content navigation is based on content presentation structures that are not encrypted as according to the specification for AACS content protection for HD-DVD such as navigation packs NV_PCK. For enhanced content presentation, dedicated rules apply that make ripping of enhanced presentation code unlikely.

Audio playback will be done by the graphics card and exclusively through HDMI.

The rationale behind this is that there are currently no secure sound cards, so software content protection like Microsoft's PUMA technology would otherwise be needed, thus making the solution OS dependent. And software cryptography can never be as secure as corresponding hardware implementations. Another problem is the need for a connection between sound card and graphics card in the event that these happen to be separate components. There is no easy way to combine two separate HDMI outputs. So the protected audio signal would need to be stripped out of the muxed premium content stream, re-encrypted using a different key and sent to the audio card where it would then be processed (decoded) and ultimately transferred back to the graphics card as a multi-channel LPCM stream which could then be muxed into the HDMI output.

This mode of operation is not currently supported by any sound device on the market and it is non-trivial to implement.

Along with a DSP decoding the video stream and the NPMS residing on the graphics card there will also be a DSP responsible for decoding the various audio compression formats supported by next generation optical storage media such as Dolby Digital (AC3)
DTS
DTS-HD
Dolby Lossless (MLP)
Dolby Digital Plus (DDP)
MPEG1
MPEG2 (multi-channel and AAC)

All compressed audio content will be decoded and muxed uncompressed into the HDCP protected HDMI output stream.

Video playback is done using integrated circuitry of the graphics card. After decrypting the premium content signal coming from the optical storage device, the NPMS will demux the content and send the video packets to a dedicated video decoder supporting the video compression formats used for nqxt generation optical storage media such as MPEG1
MPEG2
H.264
VC-1 (optional)

Decoding will be performed into a memory region protected from access through PC software by not mapping it into the address space of the PC. The decoded video signal will then be encoded into a valid HDMI video signal and combined with decoded LPCM audio to form the HUMI signal. The HDMT signal is then encrypted using HDCP and sent to the display and audio device.

Enhanced content playback imposes additional challenges onto a system that has powerful software navigation separated from secure processing of premium content. As is the case with premium video streams, the following ARFs are equally protected and never leave the secure environment of the graphics card:

JPEG/PNG image files and MNG animations
LPCM/WAV files
OpenType font files

The ISV Playback PC Software will load the encrypted content from its encapsulated storage location and send it to the NPMS for further processing. The NPMS will decrypt the content and send it to the presentation hardware.

The navigation code residing in the ISV Playback PC software will control the rendering of content by a dedicated set of rendering commands sent to the graphics card. With these commands, it is possible to configure the location of video streams, still pictures, subtitles etc. in the resulting video screen.

As navigation is performed in software, some of the encrypted enhanced resources must be available to the ISV Playback PC software:

XML document files for play-list and advanced navigation
ECMA Script files for advanced navigation As title keys are not known to the ISV Playback PC software (and never will be), some form of secure communication is needed between the navigation software and the NPMS.

As enhanced navigation code may be encrypted and the original content key is unknown to the ISV Playback PC software, that code must be decrypted by the NPMS and propagated to the ISV Playback PC software. This must not happen in clear text. The title key used to encrypt the enhanced navigation code on the physical media must not be known to the ISV Playback PC software because it can be used to decrypt premium content as well. Therefore, the NPMS must decrypt the enhanced navigation code and re-encrypt it with a different key previously established with the ISV Playback PC software.

Before playback of premium content starts, the ISV Playback PC software will not only serve as a proxy for authentication between the optical storage device and the NPMS. Furthermore it will establish a secure channel with the NPMS itself, resulting in a 128 bit AES bus key. While establishing the secure channel, both sides will make sure that their respective communication partners are authorized. Authorization may be withdrawn whenever an exploit of a particular component becomes public.

Using this bus key, enhanced navigation elements may be propagated to the ISV Playback PC software securely.

HDMI provides the possibility to forward remote control signals between devices. DPMP allows the ISV Playback PC software to control the display and amplifier by sending remote control signals to the graphics card.

These signals will then be muxed into the HDMI output signal and thus sent to the display or amplifier connected to the HDMI output of the graphics card Hardware debugging efforts will be thwarted by a number of protection measures to be implemented in a DPMP system:
  No user accessible buses carry unencrypted content. When designing a board layout of a DPMP graphics card the NPMS will be integrated with the presentation DSPs or integrated circuits such as the H.264 decoder or will use pin assignments that haven't been specified publicly.
  Encrypted (HDCP) HDMI output will be generated right where audio and video signals are generated.
  The graphics card will use virtual memory for storage of decrypted, decoded video. The memory controller will make sure this memory is not accessible from PC software The best protection against content ripping is accomplished by implementing all cryptographic functionality in hardware rather than software. All transfer of premium content takes place between hardware components. The software merely serves as a proxy that does not understand the data that is being transferred.

AACS authentication ensures that no content will be delivered to a revoked component or an unauthorized destination. At the same timer the NPMS will make sure that all copy control information is authentic and hasn't been tampered with by verifying signatures and digest information associated with it.

AACS Content revocation lists ensure that no revoked content may be played using DPMP technology.

To protect enhanced navigation structures, the DPMP ISV Playback PC software will be designed such that it can withstand attacks performed by hackers by avoiding attack vectors such as "secret" switches that disable security. Furthermore, the ISV Playback PC software will be protected against pirate actions by deploying a number of best-practice rules for tamper-resistant programming:
  Code obfuscation
    Multithreaded calculations
    Automated Code obfuscation techniques
    Insertion of dummy code to hide essential routines
  Hiding and obfuscation of secret constants and keys
    Encryption on hard-disk
    Encryption in memory
    Splitting keys and constants into parts and storing them separately in different memory regions
  Anti-Debugging measures such as
    Detecting debuggers and executing different code upon detection
    Code and data encryption in memory
  Software and module (DLL) signing and authentication
    Code signing and signature verification
    Component authentication for secure communication across module boundaries
  Random number generator
    Fulfilling the requirements of FIPS PUB 140-1, particularly the "Security requirements for cryptographic modules" as outlines in section 140-1
    Using a runtime entropy of at least one random bit value per random number produced If a security flaw becomes known within a specific variant of ISV Playback PC software, the software may be revoked by locking it out of the authentication process necessary for establishing a bus key for enhanced navigation structure propagation.

To be able to revoke ISV Playback PC software when it is known to be compromised, updated revocation information will be present on each premium content media. That revocation information will be cryptographically signed.

To ensure that the update information hasn't been taken from a different media, the signature will be cryptographically bound against the KvU (Volume Unique Key) of a HD-DVD.

Before a secure channel is established between ISV Playback PC software and DPMP, an updated revocation list will be sent to the DPMP.

The DPMP will compare the version number of the revocation list to the one it is storing in non-volatile memory. If the version number is higher, the new revocation list will be installed in non-volatile memory.

Figure 11:
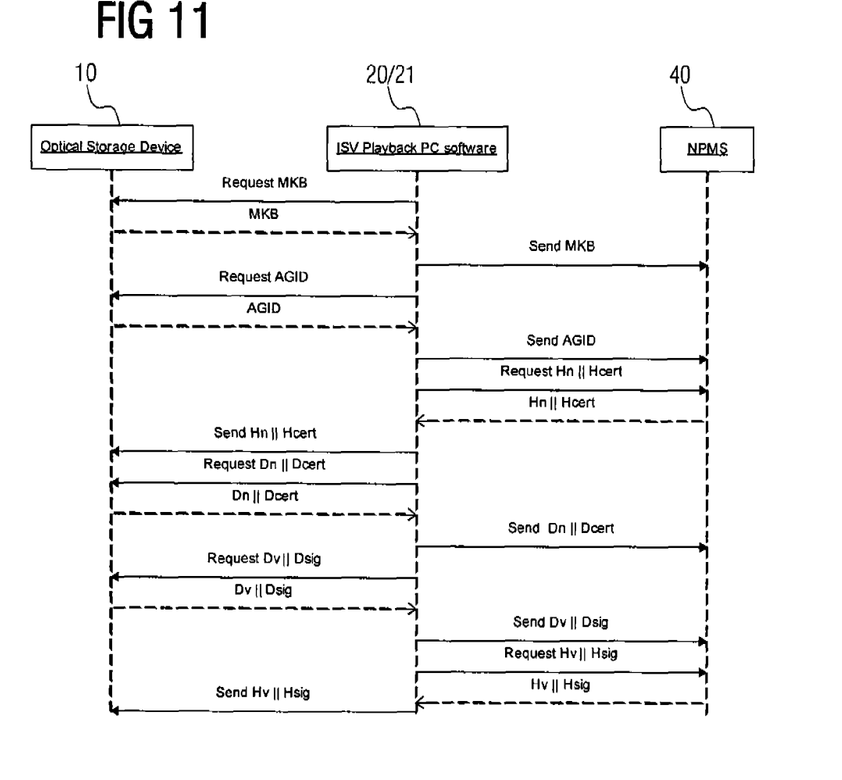
FIG. 11 illustrates the communication between the optical storage device and the NPMS block via PC playback software for AACS-compatible implementation.

FIG. 11 illustrates an explanation of how communication between the optical storage device and the NPMS is performed. Communication between these components takes place as part of the AAC authentication sequence, the result of which is the cryptographic key 100 shown in FIG. 10 indirectly governing the title keys of AACS protected media.

MKB illustrates the media key block. AGID indicates an authentication guide identity. Hn indicates a certain host (NPMS) nounce, which typically is a random number. Hcert indicates a host certificate. Dn indicates an optical storage device nounce, which is also a random number typically generated by the optical storage device. Dcert indicates an optical storage device certificate. The "∥" sign indicates data concatenation.

Dv illustrates a point on an elliptic curve calculated by the device using an ECDSA algorithm, and Dsig indicates a digital signature generated by the optical storage device. Analogously, Hv indicates a point on an elliptic curve calculated by the ECDSA algorithm running in the NPMS, and Hsig illustrates a digital signature generated by the host device 40.

Using these cryptographic packets, the authentication is done and the AAC as unique key 100 is output.

The sequence in FIG. 11 clearly illustrates that there is no direct channel between NPMS 40 and optic storage device 10. Instead, the well-understood open architecture capabilities of the personal computer are used for managing the traffic between the NPMS 40 and the storage device 10. Stated differently, these cryptographic communication parts do not directly communicate to each other. Instead, the data exchange between these two parties is organized by the ISV playback PC software in that a cryptographic communication party only outputs the data, when a request is received from the PC software. Additionally, data is only sent to the software rather than directly to the other party.

This communication architecture allows implementing a secure system in an open architecture environment, i.e. without compromising the market acceptance by introducing two severe restrictions on the user how she or he can use her or his computer.

FIGS. 12a and 12b illustrate an authentication sequence used for establishing a secure channel between the hardware multimedia endpoint and the ISV playback PC software for the purpose of exchanging navigation data. Particularly, a secure bus key between the NPMS reciting on the graphics card and the ISV playback PC software is established, which is required to obtain enhanced navigation data. The bus key negotiation is based on symmetric encryption using AES-128 as well as the broadcast encryption mechanism that is described in "C. K. Wong, M. Gouda, S. S. Lam, *Secure Group Communications Using Key Graphs, Technical Report TR* 97-23, The University of Texas at Austin, July 1997, and in D. M. Wallner, E. J. Harder, and R. C. Agee, *Key Management of Multicast: Issues and Architectures, Request for Comments* 2627, June 1999".

A detailed description of the messages and the keys is illustrated in FIG. 12*b*.

To summarize, the inventive concept provides a device and method for exchanging cryptographic information between a key provider and a multimedia endpoint, where a proxy is used to bridge the key provider with the multimedia endpoint. In a preferred embodiment, a personal computer is used as the proxy server. Preferably, the multimedia endpoint is a piece of hardware directly connected to the personal computer. Furthermore, the key provider is a physical media in conjunction with a reader for that type of physical media, i.e., physical storage media.

Moreover, depending on certain implementation requirements of the inventive methods, the inventive methods can be implemented in hardware or in software. The implementation can be performed using a digital storage medium, in particular a disk or a CD having electronically readable control signals stored thereon, which can cooperate with a programmable computer system such that the inventive methods are performed. Generally, the present invention is, therefore, a computer program product with a program code stored on a machine-readable carrier, the program code being configured for performing at least one of the inventive methods, when the computer program products runs on a computer. In other words, the inventive methods are, therefore, a computer program having a program code for performing the inventive methods, when the computer program runs on a computer.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. A personal computer system, comprising:
 a personal computer bus having attached therewith a personal computer main processor;
 a data communication interface for establishing a communication to a key provider so that the key provider, located in a device attached to the personal computer bus, can communicate via the personal computer bus; and
 an internal interface attached to the personal computer bus, the internal interface being connected to an adapter card having a hardware multimedia endpoint, the hardware multimedia endpoint comprising:
 an interface for interfacing to a computer; and
 a processor for receiving cryptographic information from the computer, for processing the cryptographic information, and for outputting cryptographic information to the computer,
 wherein the processor is operative to process cryptographic information such that an authentication procedure with a third party, which is different from the computer is established, wherein the computer system is operative to receive and forward cryptographic information between the hardware multimedia endpoint and the key provider such that an authentication procedure between the key provider and the hardware multimedia endpoint, which are different from the personal computer main processor, is established, wherein the adapter card is a graphics card, a printer card or a sound card.

2. A computer system in accordance with claim 1, in which the key provider is located in a peripheral device attached to the personal computer bus, and
 in which the hardware multimedia endpoint is located on an adapter card for an additional peripheral device located within the computer system.

3. The computer system in accordance with claim 2, in which the key provider is included in an optical disk drive operative to read optical media having stored thereon audio or video content, and
 in which the hardware multimedia endpoint is included on a graphics adapter card.

4. The computer system of claim 2, being operative to perform a user mode application for organizing a communication between the peripheral device and an adapter driver for driving the adapter card or to derive from a user input an action to be performed and to trigger a corresponding authentication procedure.

5. The computer system in accordance with claim 1, further comprising a user mode application for organizing a communication between a peripheral device having the key provider and an adapter driver for driving an adapter card having the hardware multimedia endpoint and to derive, from a user input, an action to be performed and to trigger a corresponding authentication procedure between the peripheral device and the adapter card.

6. The computer system in accordance with claim 5, in which the user mode application is operative to establish a connection between the key provider and the hardware multimedia endpoint so that the hardware multimedia endpoint gets knowledge of an authentication protocol to be performed, whereby the hardware multimedia endpoint knows whether it is to initially send or initially receive a data packet.

7. The computer system in accordance with claim 6, which is operative to prompt the key provider or the hardware multimedia endpoint to start providing a data packet,
 in which the computer is operative to forward a received data packet to a communication partner, in which the computer is operative to prompt the other communication partner to send a reply packet, and
 in which the computer is operative to forward the reply packet to the first communication partner.

8. A method of operating a personal computer system comprising a personal computer bus having attached therewith a personal computer main processor and a data communication interface, comprising:
 establishing a communication to a key provider, located in a device attached to the personal computer bus, so that the key provider can communicate via the personal computer bus; and
 establishing a communication to an adapter card having a hardware multimedia endpoint, the hardware multimedia endpoint comprising:
 an interface for interfacing to a computer; and
 a processor for receiving cryptographic information from the computer, for processing the cryptographic information, and for outputting cryptographic information to the computer, wherein the processor is operative to process cryptographic information such that an authentication procedure with a third party, which is different from the computer is established, wherein the adapter card is a graphics card, a printer card or a sound card, so that the hardware multimedia endpoint can communicate via the personal computer bus; and receiving and forwarding cryptographic information between the hardware multimedia endpoint and the key provider such that an authentication procedure between the key provider, which is different from the personal computer main processor and the hardware multimedia endpoint is established.

9. A digital storage medium having stored thereon a computer program for performing, when running on a computer, a method of operating a personal computer system comprising a personal computer bus having attached therewith a personal computer main processor and a data communication interface, comprising:

establishing a communication to a key provider, located in a device attached to the personal computer bus, so that the key provider can communicate via the personal computer bus; and establishing a communication to an adapter card having a hardware multimedia endpoint, the hardware multimedia endpoint comprising:

an interface for interfacing to a computer; and a processor for receiving cryptographic information from the computer, for processing the cryptographic information, and for outputting cryptographic information to the computer, wherein the processor is operative to process cryptographic information such that an authentication procedure with a third party, which is different from the computer is established, wherein the adapter card is a graphics card, a printer card or a sound card, so that the hardware multimedia endpoint can communicate via the personal computer bus; and receiving and forwarding cryptographic information between the hardware multimedia endpoint and the key provider such that an authentication procedure between the key provider, which is different from the personal computer main processor and the hardware multimedia endpoint is established.

\* \* \* \* \*